UNITED STATES PATENT OFFICE.

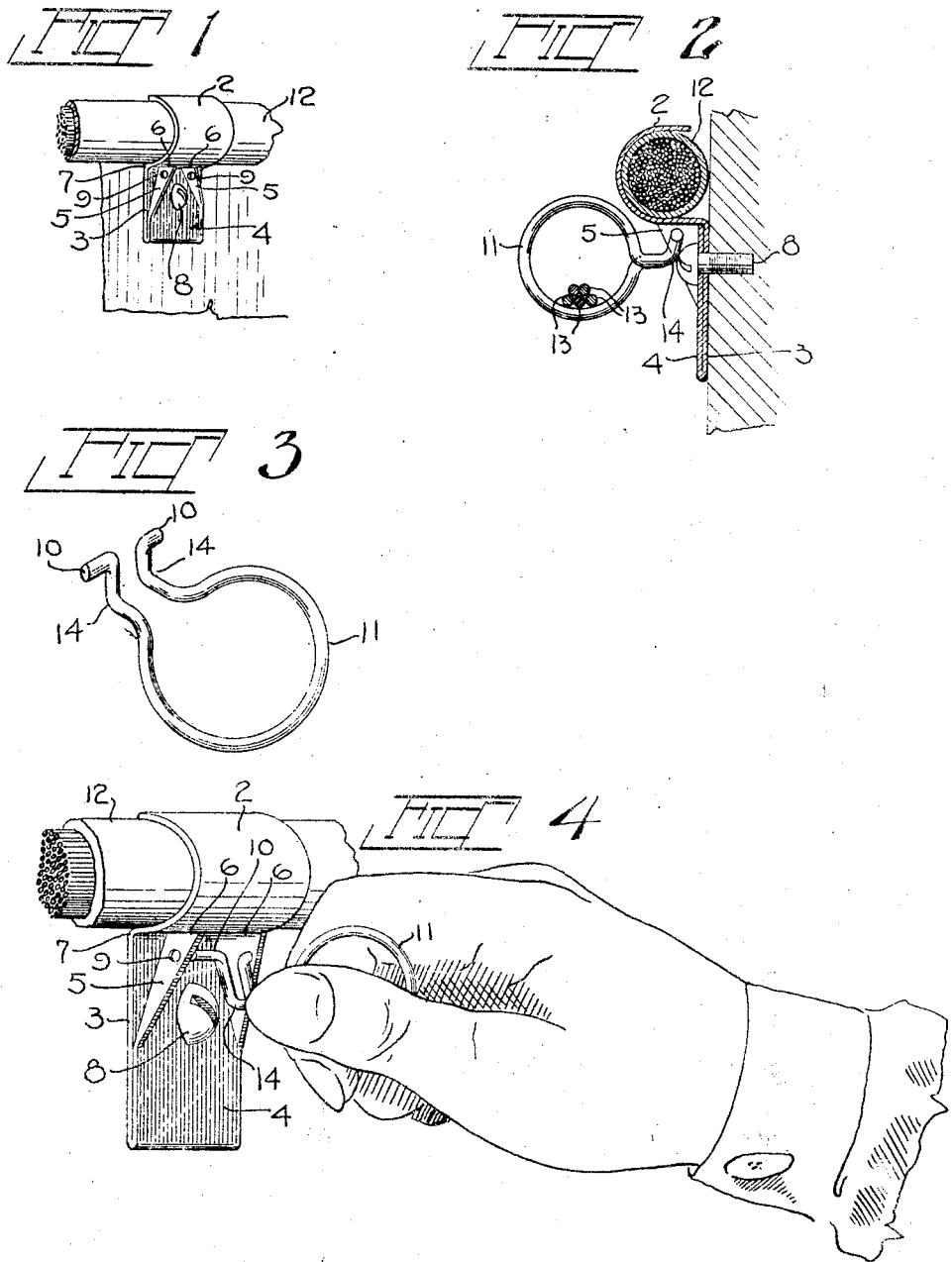

HENRY W. PLEISTER, OF WESTFIELD, NEW JERSEY, ASSIGNOR TO HENRY B. NEWHALL, JR., EXECUTOR OF HENRY B. NEWHALL, DECEASED.

CABLE-CLAMP AND BRIDLE-RING.

1,365,609.

Specification of Letters Patent. Patented Jan. 11, 1921.

Application filed October 4, 1919. Serial No. 328,518.

*To all whom it may concern:*

Be it known that I, HENRY W. PLEISTER, a citizen of the United States, residing at Westfield, in the county of Union and State of New Jersey, have invented certain new and useful Improvements in Cable-Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a non-threaded bridle ring, which may be used in combination with the conduit or cable clamp or independently. It further relates to such a bridle ring, which can be formed of relatively small gage wire. It further relates to such a bridle ring, which will form a complete closed loop around the bridle wire, or strands of bridle wires, and thereby prevent any accidental disengagement of the bridle wire from the bridle ring.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and of a cable which it supports;

Fig. 2 is a transverse vertical section of my cable clamp and conduit, showing my bridle ring in its operative position;

Fig. 3 is a perspective view of my bridle ring; and

Fig. 4 is a perspective view showing the manner of applying my bridle ring to my conduit and cable clamp.

In this form of my invention my conduit and cable clamp 1 is formed of a hook portion 2 and a heel 3, reinforced by a reinforcing member 4 bent back upon the heel 3 and provided with two brackets or shelves 5, 5 which are themselves bent out at an angle to the heel 3. Their upper surfaces 6, 6 fit snugly against the hook portion 2 and serve to strengthen the weakest portion 7 of the conduit and cable clamp, which portion is the meeting surface of the heel or base 3 and the hook portion 2. These brackets or shelves 5, 5 transmit a large portion of the bending strains from the surface 7 directly to the securing screw 8.

In the shelves or brackets 5, 5 I provide locking surfaces in the form of openings 9, 9 to coöperate with the two ends or arms 10, 10 of my bridle ring 11.

Previous to my invention bridle rings have been used with conduit and cable clamps. These bridle rings are what are known as "pig-tail," having one of their ends provided with machine screw threads to coöperate with machine female screw threads in the heel of the cable clamp.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit and cable clamp may be used as a separate article of manufacture or sub-combination, and then later, when the needs of the service demands it, my bridle ring may be supported by the same conduit or cable clamp, when the complete combination would be used.

When it is determined by those in authority that it is desirable to string runs of bridle wires parallel to the cable 12, it is merely necessary, in my invention, to place one of the arms 10 in the hole 6, for example, and then compress the bridle ring 11, as shown in Fig. 4, so as to bring the other arm 10, beneath the other shelf or bracket 5, when by simple manipulation the end or arm 10 will snap into the locking surface or opening 9 and the bridle ring will be securely held to the cable clamp 1 without, in this invention, disturbing the screw 8. The runs of bridle wire 13, 13 can then be threaded through the bridle ring, which will completely encircle them with a closed loop and prevent their accidental disengagement.

I preferably bend my bridle ring 11, so as to form shoulders 14, 14, Fig. 3, which when the ring is located on the conduit or cable clamp will bear on the head of the securing screw 8 and will prevent the bridle ring from sagging.

Should at any future time it be desirable to remove the bridle ring, this can be easily done by compressing the bridle ring to permit one of the arms 10 to become disengaged from its bracket or shelf 5, when the other arm can be readily disengaged.

It will be noted that in my improved construction that no tapping or screw threading of the heel is required; that no screw threads on the bridle ring are necessary or desirable; that much thinner and lighter wire can be used to form my bridle ring than can be used in the ordinary commercial form of pig-tail bridle ring; and that a closed loop is formed around the strands of bridle wire so that they cannot become disengaged from the bridle ring.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit and cable clamp having a heel portion and a hook portion, the heel portion being provided with means to coöperate with a nonthreaded bridle ring, and a nonthreaded bridle ring having a shoulder to rest on the head of a screw or other securing means to hold the bridle ring in its correct position.

2. A conduit and cable clamp having a heel portion and a hook portion, the heel portion being provided with means to coöperate with a nonthreaded bridle ring, and a nonthreaded bridle ring having a shoulder to hold the bridle ring in its correct position.

HENRY W. PLEISTER.

Witnesses:
A. M. WILLIAMS,
M. R. RYAN.